US008724176B2

(12) United States Patent
Jones et al.

(10) Patent No.: US 8,724,176 B2
(45) Date of Patent: May 13, 2014

(54) FUSING OF UNASSOCIATED IMAGES

(75) Inventors: Christopher Lee Jones, Fairport, NY (US); Thomas Alan Silver, Rochester, NY (US); Jason Robert Croft, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 13/325,476

(22) Filed: Dec. 14, 2011

(65) Prior Publication Data
US 2013/0155471 A1 Jun. 20, 2013

(51) Int. Cl.
*H04N 1/40* (2006.01)

(52) U.S. Cl.
USPC .......... 358/3.28; 358/450; 358/540; 358/3.06

(58) Field of Classification Search
None
See application file for complete search history.

(56) References Cited

U.S. PATENT DOCUMENTS

| 6,112,902 | A * | 9/2000 | Hayduchok et al. | 209/3.3 |
|---|---|---|---|---|
| 6,515,760 | B1 * | 2/2003 | Lourette et al. | 358/1.18 |
| 7,551,310 | B2 * | 6/2009 | Yudasaka et al. | 358/1.18 |
| 7,649,659 | B2 * | 1/2010 | Nabemoto et al. | 358/538 |
| 8,157,254 | B2 * | 4/2012 | DeWitt et al. | 270/52.01 |
| 2004/0174563 | A1 * | 9/2004 | Cassidy et al. | 358/1.18 |
| 2005/0018214 | A1 * | 1/2005 | DeWitt et al. | 358/1.1 |
| 2005/0140991 | A1 * | 6/2005 | Ogiwara et al. | 358/1.2 |

OTHER PUBLICATIONS

U.S. Appl. No. 12/819,656, filed Jun. 21, 2010; Title: System and Method for Clean Document Reconstruction From Annotated Document Images; Inventors: Marshall W. Bern et al.

* cited by examiner

Primary Examiner — Dung Tran
(74) Attorney, Agent, or Firm — Fay Sharpe LLP

(57) ABSTRACT

As set forth herein, methods and systems facilitate the fusing of unassociated images into an original document image. An unassociated image is received into a set of unassociated images in computer memory by an associated scanning device, and the size for each unassociated image is determined. The size of each unassociated image is then compared to at least one other known image size, and a matching related unassociated image is retrieved from the set of unassociated images corresponding to each unassociated image based at least in part on an output of the comparison. The matches of related images are then aligned and fused to form an original document image.

17 Claims, 8 Drawing Sheets

Please Print or Type Clearly

| ID Number -- | |
|---|---|
| Group Number: | Identification Number: |

| Patient's Information -- | | | |
|---|---|---|---|
| Patient's Full Legal Name (Last, First, Middle Initial) | Sex<br>☐ Male<br>☐ Female | SS#(optional)<br>__/__/____ | Date of Birth<br>Month Day Year |

Patient Is: ☐ Member ☐ Spouse ☐ Child ☐ Other (please explain)

| Member Information -- | | |
|---|---|---|
| Member (Policy Holder) Name: | SS# (optional)<br>__/__/____ | Date of Birth<br>Month Day Year |
| Current Address: | | Home Phone:<br>(___)___-____ |

| Claim Information: | | |
|---|---|---|
| Accidental Injury:<br>☐Yes ☐No | Worker's Compensation Claim?<br>☐Yes ☐No | Date of Accident |
| Briefly Describe Injury: | | |

Sign
Here:_____ Date:_____
Signature of Member

Form A

Please Print or Type Clearly

| ID Number -- | |
|---|---|
| Group Number: 123456 | Identification Number: 78948C |

| Patient's Information -- | | | |
|---|---|---|---|
| Patient's Full Legal Name (Last, First, Middle Initial) Doe, Jane D. | Sex ☒ Male ☐ Female | SS#(optional) __/__/____ | Date of Birth Month Day Year |

Patient Is: ☒ Member ☐ Spouse ☐ Child ☐ Other (please explain)

| Member Information -- | | |
|---|---|---|
| Member (Policy Holder) Name: Jane D. Doe | SS# (optional) __/__/____ | Date of Birth Month Day Year |
| Current Address: 123 Road | | Home Phone: (___)___-____ |

Claim Information:

| Accidental Injury: ☐ Yes ☐ No | Worker's Compensation Claim? ☐ Yes ☐ No | Date of Accident |
|---|---|---|
| Briefly Describe Injury: | | |

Sign Here: _Jane D. Doe_____ Date: _____
Signature of Member

Form A

Please Print or Type Clearly

| ID Number -- | |
|---|---|
| Group Number: | Identification Number: |

| Patient's Information -- | | | |
|---|---|---|---|
| Patient's Full Legal Name (Last, First, Middle Initial) | Sex<br>☐ Male<br>☐ Female | SS#(optional)<br>__/__/____ | Date of Birth<br>Month  Day  Year |

Patient Is: ☐ Member ☐ Spouse ☐ Child ☐ Other (please explain)

| M~~ember Information~~ -- | | |
|---|---|---|
| ~~Member Infor~~(~~Policy Hold~~er) Name: | SS# (optional) | Date of Birth<br>Month  Day  Year |
| Current Address: | | Home Phone:<br>(___)___-____ |

| Claim Information: | | |
|---|---|---|
| Accidental Injury:<br>☐Yes  ☐No | Worker's Compensation Claim?<br>☐Yes  ☐No | Date of Accident |
| Briefly Describe Injury: | | |

Sign
Here: _____ Date: _____
Signature of Member

Form A

*FIG. 3*

FUSING OF UNASSOCIATED IMAGES

BACKGROUND

The exemplary embodiment relates to a system and method for fusing unassociated images into a corresponding original image.

Several thousand envelopes may arrive at a production imaging facility on a daily basis. Typically, the production facility uses a machine to automate the envelope opening process rather than manually opening the envelopes. A majority of the machines slice the envelope on the top and across the side to extract the contents of the envelope. This process is commonly referred to as "slicing" or "cutting" the envelope.

Generally, the envelope sizes as well as the contents inside the envelope vary. The variability of the envelopes may cause the size and thickness of the envelope to differ. The envelope slicing machine operator normally sets the machine cutting depth to slice open a majority of the envelopes. Due to the size and thickness of the envelopes and contents, not only the envelope may be sliced but also contents of the envelope. Therefore, the content(s), e.g., a physical document, is damaged when sliced, resulting in two or more sliced portions or unassociated pieces of the physical document, which if scanned, would result in two or more unassociated images. An exception process is then imposed which requires manually taping both sides of the damaged document to form an original image from two or more sliced portions. Disadvantageously, the tape may catch inside the high speed scanner when the reconstituted physical document is scanned.

Thus, it is desirable to have a method for electronically fusing an original image from unassociated images to eliminate physical rework tasks, eliminate necessary supplies, and to retain the physical integrity of a document, in particular, for legal purposes and service level agreements as well as many others.

INCORPORATION BY REFERENCE

U.S. application Ser. No. 12/819,656 entitled SYSTEM AND METHOD FOR CLEAN DOCUMENT RECONSTRUCTION FROM ANNOTATED DOCUMENT IMAGES, filed on Jun. 21, 2010, discloses a computer-implemented method for reconstructing a document from annotated document images. The method includes receiving a set of at least two annotated document images into computer memory, the annotated document images each include static elements and annotated data, and performing an alignment on each annotated document image with respect to at least one other annotated document image in the set of annotated document images. A consensus document image is then formed based on the aligned annotated document images in which at least some annotation data derived from the aligned annotated document images is obscured. Then consensus document image is then output. The disclosure of which is incorporated herein by reference in its entirety.

BRIEF DESCRIPTION

In some illustrative embodiments disclosed as illustrative examples herein, method for fusing unassociated images into an original document image includes, with processor, receiving an unassociated image into a set of unassociated images in computer memory by an associated scanning device, and determining a size for each unassociated image. The method also includes comparing the size of each unassociated image with respect to at least one other known image size, and retrieving a matching related unassociated image from the set of unassociated images corresponding to each unassociated image based at least in part on an output of the comparison. In addition, the method includes aligning the matches of related images, and also fusing the matches of related images to form an original document image.

In some illustrative embodiments disclosed as illustrative examples herein, a computer-based system for electronically fusing unassociated images into an original document image includes a computer processor and computer memory. The computer memory stores, a scan selection module, a set of unassociated images, a size determination module, a comparison module, a retrieval module, an alignment module, and a fusion module. The computer processor implements the modules, such that the scan selection module is operative to receive an unassociated image into a set of unassociated images. The size determination module is operative to determine a size for each unassociated image. The comparison module is operative to compare the size of each unassociated image with respect to at least one other known image size. The retrieval module is operative to retrieve a matching related unassociated image from the set of unassociated images corresponding to each unassociated image based at least in part on an output of the comparison module. The alignment module is operative to align the matches of related images, and the fusion component is operative to fuse the matches of related images to form an original document image.

In some illustrative embodiments disclosed as illustrative examples herein, a computer-implemented method for fusing unassociated images into an original document image includes with a processor, receiving a plurality of unassociated images into for a set of unassociated images in computer memory, and determining a size for each unassociated image wherein the detecting of the size is based on a digital measurement of at least a height, a width, or a combination of both. The method also includes comparing the size of each unassociated image with respect to at least one other known image size to find matches of related images in the set of unassociated images, and retrieving a matching related unassociated image from the set of unassociated images corresponding to each unassociated image based at least in part on an output of the size comparison. In addition, the method includes determining a contextual relationship for each of the related annotated unassociated images, and assigning a confidence threshold rating to identify the matches of related images in the set of annotated unassociated images responsive to the determined contextual relationship corresponding thereto. The method also includes comparing the assigned confidence threshold rating to a predetermined confidence threshold rating, and fusing the matches of related images to form an original document in accordance with an output of the comparison indicating the assigned confidence threshold rating is greater than or equal to the predetermined confidence threshold rating. Furthermore, the method includes communicating the original document to an image repository.

BRIEF DESCRIPTION OF THE DRAWINGS

FIG. 1 graphically illustrates an image of an original document without annotation data according to one embodiment of the subject application;

FIG. 2 graphically illustrates the image of the original document of FIG. 1 with annotation data added according to one embodiment of the subject application;

FIG. 3 graphically illustrates a sliced original document image of FIG. 1 according to one embodiment of the subject application;

DETAILED DESCRIPTION

Disclosed herein are a method and system for electronically fusing unassociated images into a single image representative of an original document. It will be appreciated that the original document may be annotated and therefore, any unassociated images corresponding to the document would include such annotations. In one embodiment, the image size of unassociated images are determined and compared to a list of standard sizes. In another embodiment, text is extracted from annotated unassociated images to determine a contextual relationship for each of the annotated unassociated images. These approaches provide a solution for eliminating physical rework tasks and necessary supplies such as transparent tape required to tape together sliced portions of an original document (unassociated images when scanned separately) for sending through a high volume scanner as a single document. Other advantages include reducing turnaround times, increasing service level agreement achievements, and enabling performance at any location and/or in any time zone compared to the physical process of taping.

As used herein, an "original document" is a document with a fixed page layout containing static elements such as fixed text, fixed boundaries and other page elements intended to be reproduced on all like documents. For example, FIG. 1 illustrates an example original document 100, i.e., a medical insurance form. Such original documents may also include a W-2 tax withholding form, a 1099 tax form, a Bureau of Motor Vehicles form, a credit card application, and any other legal and/or service forms. It will be appreciated that the term "original document image 100" is used herein to refer to an electronic, i.e., digitized, representation of an original hard copy document. For example, the illustration of the original document in FIG. 1 may be referenced hereinafter as an illustration of the tangible form of the original document or the electronic representation of the tangible form of the original document.

The original document 100 can be considered as a blank form that is to be filled out (annotated) with information by a user. Accordingly, annotated documents are modified original documents containing variable data (annotations) added by a user or other agent (such as a computer system). Annotated document images are one or more images from an annotated document that have been scanned, downloaded, or otherwise input into computer memory. FIG. 2 illustrates an example annotated document image 200.

Figure 5:
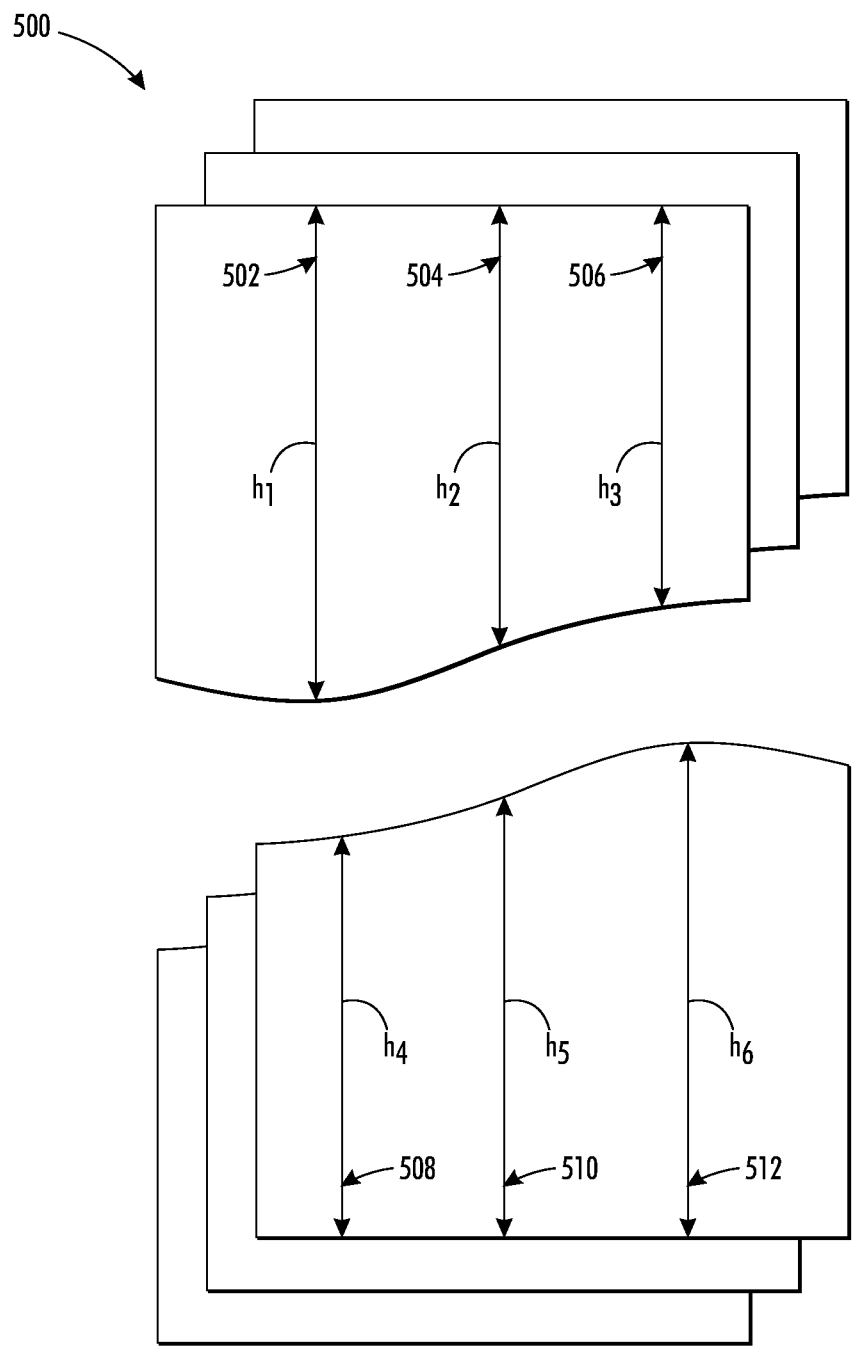
FIG. 5 graphically illustrates at least two or more unassociated images for detecting a size according to one embodiment of the subject application.
Figure 6:
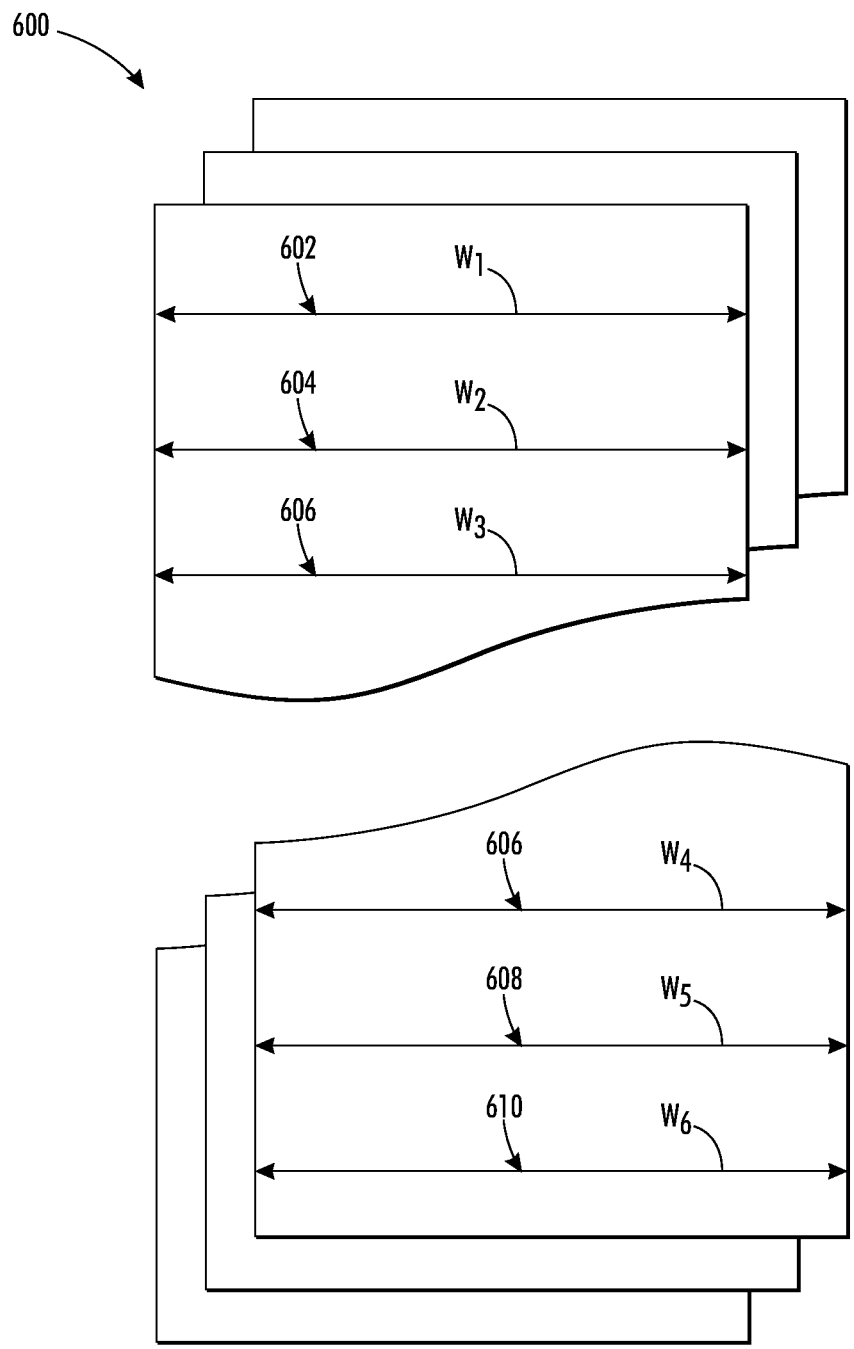
FIG. 6 graphically illustrates at least two or more unassociated images for detecting a size according to one embodiment of the subject application.

As used herein, "unassociated image(s)" may result when an original document is sliced by an envelope slicing machine and electronic data is generated. Accordingly, unassociated images are at least two or more slices of an original document 100. For example, FIG. 3 illustrates an example of a set of unassociated images 300, i.e., a sliced medical insurance form. It will be appreciated that the unassociated images 300 may correspond to two or more "slices" of the original document 100, which may be scanned separately in accordance with the subject application resulting in digital representations of each slice of the original document 100. FIGS. 5 and 6 further illustrate examples of unassociated images 500, and 600. In accordance with one embodiment, the unassociated images may be annotated.

Figure 4:
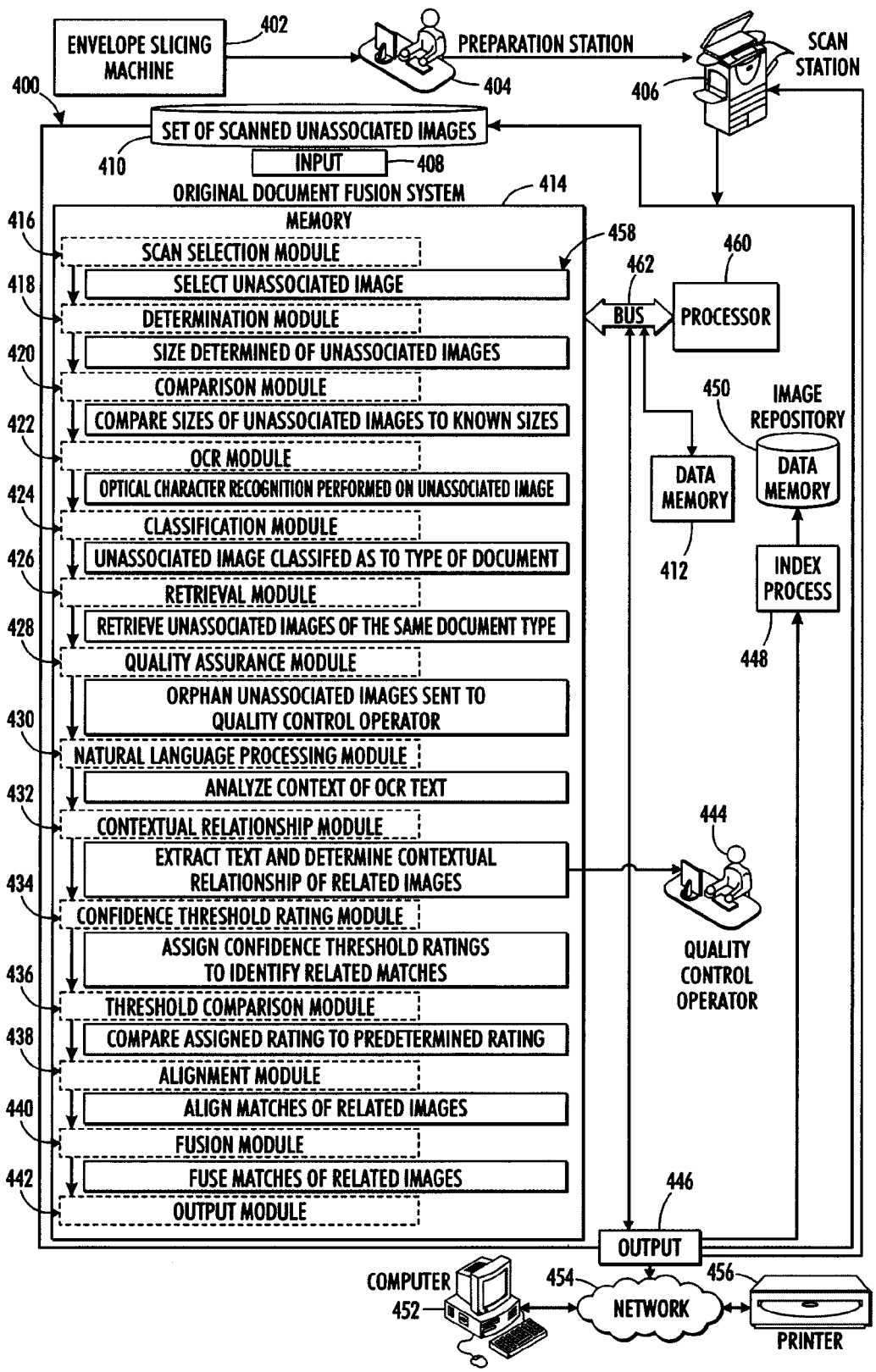
FIG. 4 is a high-level overview of an exemplary system for fusing an original document image from a set of unassociated images according to one embodiment of the subject application.

With reference to FIG. 4, an exemplary system 400 for fusing two or more unassociated images 300 into an original document image 100 is illustrated. It will be appreciated that the various components depicted in FIG. 4 are for purposes of illustrating aspects of the subject application, and that other similar components, implemented via hardware, software, or a combination thereof, are capable of being substituted therein. The system 400 may include an envelope slicing machine 402, a preparation station 404, a scan station 406, an input device 408, a set of annotated document images 410, memory 412 and 414 (described in greater detail as the memory 804 of FIG. 8), and a processor 460 (described in greater detail below as the processor 802 of FIG. 8). It will be appreciated that while illustrated in FIG. 4, the slicing machine 402, preparation station 404, scan station 406, and input device 408 are depicted for example purposes only, and the subject systems and methods may be implemented with or without such devices, e.g., on a database of images (e.g., the collection 410, the image repository 450, or the like) in which are stored previously scanned images, and the like. According to one embodiment, the set of scanned unassociated images 410 includes a plurality of unassociated images 300 that may, when combined, result in a corresponding plurality of original documents 100 or 200. For example purposes, reference is now made hereinafter to an example using two or more annotated unassociated images 300, i.e., unassociated images 300 that include additional textual information (filled in form or the like).

As will be appreciated, the system 400 is representative of any computing system, which comprises at least a processor 460 (see, e.g., the processor 802 of FIG. 8) that executes, and a memory 412, 414 (see, e.g., the memory 804 of FIG. 8) that stores computer-executable instructions for providing the various functions, calculations, selections, and the like, described herein.

In accordance with one embodiment of the subject application, the system 400 is capable of being employed as one possible hardware configuration to support the systems and methods described herein. The skilled artisan will further appreciate that although the system 400 is illustrated as a standalone device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the system 400 may include a computer server, workstation, personal computer, combination thereof, or any other computing device.

The system 400 can include a processing unit 460 (see, e.g. FIG. 8), a system memory 412, 414 (see, e.g. FIG. 8), and a system bus 462 (such as the bus 812 of FIG. 8) that couples various system components including the system memory 412, 414 to the processing unit 460. The processing unit 460 can be any of various commercially available processors. The processing unit 460 can be variously embodied, such as by a single-core processor, a dual-core processor (or more generally by a multiple-core processor), a digital processor and cooperating math coprocessor, a digital controller, or the like. The processing unit 460, in addition to controlling the operation of the system 400, executes instructions stored in memory 412, 414 for performing the methods outlined in the FIGURES as described more fully herein.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The system 400 may include at least some form of computer readable media. Computer readable media can be any available media that can be accessed by the system 400. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11 (x), a proprietary communications channel, infrared, optical, the public switched telephone network, or any suitable wireless data transmission system, or wired communications known in the art. Combinations of any of the above can also be included within the scope of computer readable media.

The system 400 includes data memory 412 and main memory 414, with the data memory 412 configured to store original documents and/or unassociated images 410 during processing. The memory 412 and 414 may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

It will be appreciated that the set, of scanned unassociated images 410 may be stored in any suitable computer readable media such as a ROM or RAM drive, generated by a scanner or scan station 406, and/or may be input into the system 400 in the form of a carrier wave, e.g., via the Internet. Alternatively, the original documents and/or unassociated images 410 may be generated within the system 400, itself. The input device 408 may include a modem link, a wired or wireless connection, USB port, floppy or hard disk receiver, or the like and may be separated or combined with other components of the system 400.

Main memory 414 of the system 400 stores a representative scan selection module 416, a determination module 418, a comparison module 420, an optical character recognition module 422, a classification module 424, a retrieval module 426, a quality assurance module 428, a natural language processing module 430, a contextual relationship module 432, a confidence threshold rating module 434, a threshold comparison module 436, an alignment module 438, a fusion module 440, and an output module 442. It will be appreciated that "module," as used herein, denotes application specific hardware, a set of computer-executable instructions, software code, program, routine, or other computer-executable means for performing the described function, or a suitable combination thereof, as will be understood by those of skill in the art. Furthermore, or alternatively, one or more of the functions described hereinafter with respect to the modules may be manually performed.

In the exemplary system, the components 416, 418, 420, 422, 424, 426, 428, 430, 432, 434, 436, 438, 440, and 442, comprise software instructions stored in main memory 414, which are executed by a computer processor 460. The processor 460, such as a central processing unit of an associated computer, may control the overall operation of the system 400 by execution of processing instructions stored in memory 414 (see, e.g., the processor 802 and memory 804 of FIG. 8). Components 408, 412, 414, 416, 418, 420, 422, 424, 426, 428, 430, 432, 434, 436, 438, 440, and 442 may be connected by a data control bus 146 (see, e.g., the bus 812 of FIG. 8). As will be appreciated, system 400 may include fewer or more components while still having the same functionality. For example, components 416, 418, 420, 422, 424, 426, 428, 430, 432, 434, 436, 438, 440, and 442 may be combined to form fewer components, or may be functionally separated to form more individual components.

The scan selection module 416 receives as input the set of annotated unassociated images 410 via the input device 408 and selects an annotated unassociated image 458 from the set of annotated unassociated images 410. The selected annotated unassociated image 458 is then passed from the scan selection module 416 to the size determination module 418. According to one embodiment of the subject application, the size determination module 418 facilitates the measurement of a height, width, or combination thereof, of the selected annotated unassociated image 458. FIGS. 5 and 6 depict various shapes and measurements capable of being processed and made by the operations of the size determination module 418.

With respect to FIGS. 5 and 6, the size determination module 418 performs a digital measurement of the height and width associated with the selected annotated image 458. It will be appreciated that such diverse measurements are made so as to ascertain the actual size of each annotated image. It will further be appreciated that while illustrated in FIGS. 5 and 6 as having been sliced along a horizontal axis, the subject systems and methods described herein are capable of being applied to original documents sliced along a vertical axis, multiple slices of a document in either direction, or combinations thereof. As depicted in FIG. 5, multiple measurements 502, 504, 506, 508, 510, and 512 are made of the annotated image 458 (referenced in FIG. 5 as 500). It will be appreciated that multiple measurements may be needed in accordance with the direction and number of sliced portions of an original image that may have resulted from envelope opening. Similarly, FIG. 6 illustrates multiple width measurements 602, 604, 606, 608, and 610 are made of the annotated image 458 (referenced in FIG. 6 as 600).

The comparison module 420 receives the determined size information regarding the annotated unassociated image 458 from the size determination module 418. According to one embodiment of the subject application, the comparison module 420 compares the measured size of the annotated unassociated image 458 to a set of standard page sizes. That is, the module 420 includes data representative of a plurality of common and standard paper sizes, e.g., letter, legal, ledger, A1, A2, A3, A4, A5, A6, etc., to which the annotated unassociated image 458 is compared. For example, the annotated unassociated image 458 may have height and width that match one of the acknowledged standard sizes, which would indicate that the annotated unassociated image 458 does not correspond to a "slice" of a respective original document 100. For purposes of example in FIG. 4, reference is made wherein to the annotated unassociated image 458 representing a slice, i.e., a portion, of the original document 100, as indicated by the height and width measurements being less than the standards referenced above.

Following analysis by the comparison module 420 that indicates the annotated unassociated image 458 is not a standard size; an optical character recognition module 422 is invoked or activated by the processor 460 to collect textual (character) data from the annotated unassociated image 458. The optical character data is stored in the memory 412 or 414 in association with the annotated unassociated image 458, in accordance with one embodiment of the subject application. The optical character data is then processed by the processor in accordance with the classification module 424. The classification module 424 is suitably configured to classify the annotated unassociated image 458 as to the type of original document 100 from which it is derived. That is, the classification module 424 uses the optical character recognition data to determine the type of document (tax form, credit application, legal document, etc., associated with the annotated unassociated image 458. The results of the classification module 424 are also stored in association with the annotated unassociated image 458 and optical character recognition data in the memory 412 or 414.

A retrieval module 426 is then invoked by the processor 460 or other suitable component associated with the system 400. According to one embodiment of the subject application, the retrieval module is configured to facilitate the retrieval of any annotated unassociated images in the set of images 410 that are classified as the same type of document as the annotated unassociated image 458. For example, when the annotated unassociated image 458 was classified as a W-2 form, only those annotated unassociated images in the set 410 will be retrieved for analysis. In the event that the retrieval module 426 is unable to identify any corresponding annotated unassociated images in the set 410 that corresponds to the classification of the annotated unassociated image 458, the annotated unassociated image 458 is communicated, via the quality assurance module 428, to a quality control station 444. It will be appreciated that such a determination indicates the annotated unassociated image 458 is an orphan image, which may require additional processing to locate the remaining portion(s) of the original document from which the annotated unassociated image 458 originated. For purposes of describing FIG. 4, it will be appreciated that the retrieval module 426 locates at least one additional annotated unassociated image in the set 410 that has the same type of classification as the annotated unassociated image 458.

A natural language module 430 is then used by the processor 460 to analyze the context of the optical character recognition data. That is, the language module 430 determines the contextual means of the text generated during the optical character recognition performed by the recognition module 422. Stated another way, the natural language module 430 reads the text from each annotated unassociated image of the same document type to determine the context and relationship among the available annotated unassociated images (slices).

In accordance with one embodiment, the natural language module 430 accesses a database stored on the memory 412 or 414 that contains the text detected from annotated unassociated images in the set 410 during optical character recognition. The text is suitably stored within a structured set and tagged according to the way it is used grammatically within each annotated unassociated image. Such structure may include, for example and without limitation, by definition (i.e., parts of speech such as, verbs, nouns, pronouns, adjectives, prepositions, conjunctions, interjections, interrogatories, etc.), by context (i.e., relationship with adjacent and related words in a phrase, sentence, paragraph, or the like), or other appreciated organizational structures. In such an embodiment, the natural language module 430 facilitates context determination of language in the annotated unassociated image 458 via usage patterns, statistical text analytics, rules, semantic analysis for interpreting different bodies of text, application of specific taxonomies, and the like.

A contextual relationship module 432 is then invoked to process the output of the natural language module 430 so as to determine the contextual relationship of related annotated unassociated images, i.e., those images having the same classification. A confidence threshold rating module 434 then assigns a confidence threshold rating ($Th_A$) to the related annotated unassociated images, i.e., to the annotated unassociated image 458 and the related image from the set of annotated unassociated images. According to one embodiment, the confidence threshold rating ($Th_A$) identifies the likelihood that the annotated unassociated images are related. In accordance with another embodiment, the confidence threshold rating ($Th_A$) corresponds to a percentage likelihood that the two or more annotated unassociated images are related, e.g., 75%, 80%, 85%, 95%, 98%, etc.

A threshold comparison module 436 is then activated by the processor 460 or other suitable component associated with the system 400 to determine whether the assigned confidence threshold rating ($Th_A$) is high enough to indicate a positive match. That is, the assigned rating is compared against a predetermined confidence threshold rating ($Th_C$) to determine whether the assigned rating ($Th_A$) is greater than or equal to the predetermined rating ($Th_C$). For example, the predetermined threshold rating ($Th_C$) may by 98% such that for a match to be indicated by the threshold comparison module 436, the likelihood of a match assigned to the annotated unassociated images (represented by $Th_A$) must be 98% or higher. In the event that the threshold $Th_A$ is less than the predetermined threshold $Th_C$, the annotated unassociated images, i.e., the annotated unassociated image 458 and the corresponding other annotated unassociated image(s), are communicated to the quality control station 444 for additional analysis to determine whether a match does in fact exist.

Once the threshold comparison module 436 determines a high likelihood of a match, an alignment module 438 is activated by the processor 460 or other suitable component associated with the system 400. According to one embodiment, the alignment module 438 aligns the various annotated unassociated images in accordance with, for example, the previous measurements, the contextual determinations, or the like.

A fusion module 440 is then initiated to fuse the two or more annotated unassociated images into a single digital representation of the original document 100 (or 200). In accordance with one embodiment, the fusing of the unassociated images results in the creation of a single image file, as opposed to the two or more previous files (the annotated unassociated image 458 and the other annotated unassociated image(s)). That is, the processor 460 facilitates the replacement of the annotated unassociated images with a single image, e.g., the original document image 100 or 200. The output module 442 then facilitates output of the original document image 100 or 200 representing the fused annotated unassociated images to the output component 446. That is, outputs from modules 416, 418, 420, 422, 424, 426, 428, 430, 432, 434, 436, 438, 440, and 442 may be stored in memory 412, 414 or output via an output device 446 to one or more of an index process 448, an image repository or data memory 450, a client terminal 452, or a printer 456, optionally through a network 454 such as the internet.

Figure 7:
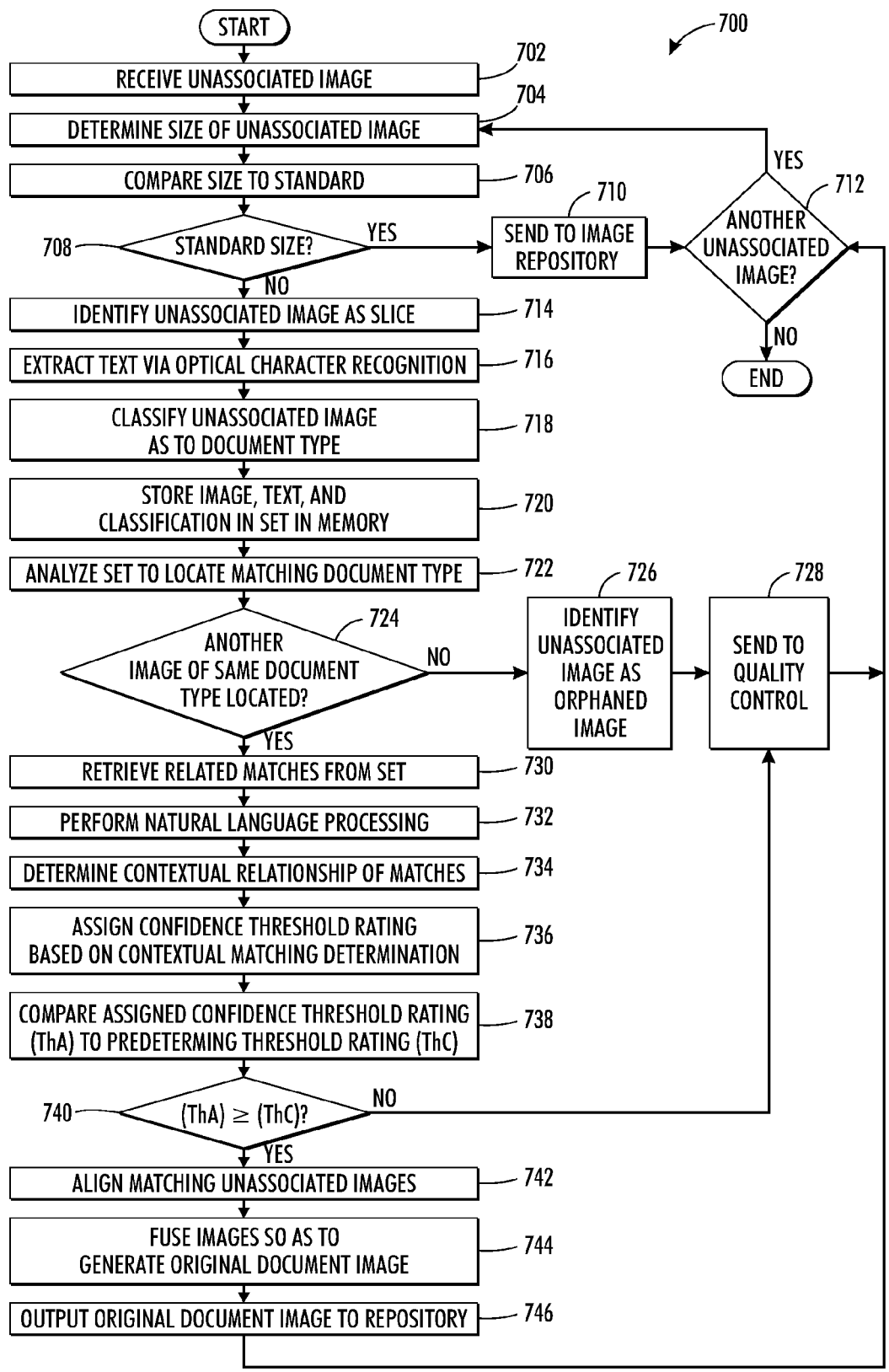
FIG. 7 is flow diagram illustrating in more detail the electronic fusing of an original document from a set of unassociated images according to one embodiment of the subject application.

With reference to FIG. 7, an exemplary method 700 for fusing unassociated images into an original document image is illustrated. The method 700 may employ the system 400 illustrated in FIG. 4. It is to be appreciated that the exemplary method may include fewer, more, or different components from those shown and need not proceed in the order illustrated. The method 700 illustrated in FIG. 7 may be implemented in a computer program product that may be executed on a computer, e.g., the system 400 of FIG. 4, the computer system 800 of FIG. 8, and the like. The computer program product may be a tangible computer-readable recording medium (such as a disk or other memory storage device) on which a control program is recorded, or may be a transmittable carrier wave in which the control program is embodied as a data signal. The illustrated method may be entirely automated or may include some user input, as noted herein.

At 702, an annotated unassociated image 458 is received via operations of the system 400, e.g., via input 408, via operation of the scan station 406, from storage 410, or the like. It will be appreciated that the origination of the received annotated unassociated image 458 is capable of corresponding to a myriad of sources, and the subject application is not limited in the manner in which such an annotated unassociated image 458 is received. At 704, the processor 460 or other suitable component associated with the system, e.g., a module, software component, dedicated hardware component, or any combination thereof, determines the size of the annotated unassociated image 458. According to one embodiment, the size determination is made in accordance with measurements performed on the annotated unassociated image 458 so as to determine the height, width, and/or a combination thereof. It will be appreciated that various standards exist with respect to paper sizes, with each standard having a set height and width associated therewith.

The determined size of the annotated unassociated image 458 is then compared to various standard sizes via operations of the processor 460 or other suitable component associated with the system 400 at 706. In accordance with one embodiment, the processor 460 or like component retrieves information, i.e., data, corresponding to various standard paper sizes (letter, legal, ledger, A4, A5, etc.) from memory 412 or 414. It will be appreciated that other sizes may be used in accordance with the subject application including, for example and without limitation, custom sizes associated with governmental forms, customer forms, checks, or the like.

A determination is then made at 708 whether the measured size at 704 corresponds to one of the standard sizes based upon the comparison performed at 706. In the event that the annotated unassociated image 458 is determined to represent a standard paper size, the processor 460 identifies the image 458 as an original document 100 (or 200) and forwards the image at 710 to the image repository 450. A subsequent determination is made, at 712, by the processor 460 or other suitable component associated with the system 400 whether an additional annotated unassociated image 458 remains for processing in accordance with the methodology of FIG. 7. When another annotated unassociated image 458 is detected, flow returns to 704, whereupon the size of the annotated unassociated image 458 is determined.

Upon a determination at 708 that the size of the annotated unassociated image 458 measured at 704 does not correspond to any standard or custom defined paper size, the annotated unassociated image 458 is identified as a "slice" of an original document image 100 (or 200). That is, the annotated unassociated image 458 is recognized by the system 400 as representative of a portion of a whole document 100 or 200. Optical character recognition is performed on the annotated unassociated image 458 at 716 by the processor 460 or other component of the system 400, e.g., the OCR module 422, so as to extract text contained in the annotated unassociated image 458.

The processor 460 or other component of the system 400 classifies the annotated unassociated image 458 as to document type at 718 based in part upon the extracted text. That is, the extracted text is analyzed to determine the type of document from which the annotated unassociated image 458 originated, e.g., W-2, credit card application, check, form, and the like. The extracted text from the OCR at 716 and the document type classification from 718 are stored in memory 412 or 414 in association with the annotated unassociated image 458 at 720.

In accordance with one embodiment of the subject application, the storage at 720 is in accordance with a predetermined structure, e.g., a database-type structure, wherein each annotated unassociated image is stored in association with its respective classification, recognized text, document source, and any other suitable organizing data. In such an embodiment, the text is suitably stored within a structured set and tagged according to the way it is used grammatically within each annotated unassociated image. Such structure may include, for example and without limitation, by definition (i.e., parts of speech such as, verbs, nouns, pronouns, adjectives, prepositions, conjunctions, interjections, interrogatories, etc.), by context (i.e., relationship with adjacent and related words in a phrase, sentence, paragraph, or the like), or other appreciated organizational structures.

At 722, the stored annotated unassociated images in the set 410 are analyzed to locate any matching document types.

That is, the processor 460 or other suitable component associated with the system 400 searches the set 410 for any annotated unassociated images that have the same classification as that of the annotated unassociated image 458. For example, when the annotated unassociated image 458 is classified as a credit card application, the set 410 is queried for any annotated unassociated images stored therein that are also classified as a credit card application. A determination is then made at 724 whether any annotated unassociated images of the same classification type as that of the annotated unassociated image 458 have been located in the set 410.

When no other annotated unassociated images in the set 410 have the same document type classification, the annotated unassociated image 458 is identified at 726 as an orphan image. That is, the annotated unassociated image 458 is identified as a portion of an original image that does not currently have an identifiable match in the set of annotated unassociated images 410. The orphan image is communicated, via operations of the processor 460 or any other suitable component of the system 400 to the quality control station 444 for additional processing at 728. It will be appreciated that in accordance with one embodiment, the quality control station 444 is configured to receive orphan images, or combined annotated unassociated images having an assigned confidence rating below a predetermined threshold, and perform additional analysis thereon to determine whether matches exist. According to one embodiment, additional algorithms may be employed at the station 444 on the received annotated unassociated images. In accordance with another embodiment, an operator analyzes and determines whether annotated unassociated images match, etc.

Upon a determination at 724 by the processor 460 or other suitable component associated with the system 400 that at least one image of the same document type as that of the annotated unassociated image 458 is located, operations proceed to 730. At 730, the located annotated unassociated image(s) that are of the same classification type as the annotated unassociated image 458 is/are retrieved from the set 410. The processor 460 performs natural language processing on the extracted text associated with the annotated unassociated image 458 and each retrieved matching annotated unassociated image at 732.

The contextual relationship of the annotated unassociated image 458 and the matching annotated unassociated image is then determined at 734 in accordance with the natural language processing of 732. In accordance with one embodiment, the processor 460 or other suitable component associated with the system 400 facilitates context determination of language in the annotated unassociated image 458 via usage patterns, statistical text analytics, rules, semantic analysis for interpreting different bodies of text, application of specific taxonomies, and the like.

A confidence threshold rating ($Th_A$) is then assigned, at 736, to the related annotated unassociated images, i.e., to the annotated unassociated image 458 and the related image from the set of annotated unassociated images. According to one embodiment, the confidence threshold rating ($Th_A$) identifies the likelihood that the annotated unassociated images are related. In accordance with another embodiment, the confidence threshold rating ($Th_A$) corresponds to a percentage likelihood that the two or more annotated unassociated images are related, e.g., 75%, 80%, 85%, 95%, 98%, etc. At 738, the processor 460 or other suitable component associated with the system 400 compares the assigned rating $Th_A$ against a predetermined confidence threshold rating ($Th_C$).

A determination is then made at 740 whether the assigned rating $Th_A$ is greater than or equal to the predetermined rating $Th_C$. For example, the predetermined threshold rating $Th_C$ may by 95% such that for a match to be determined at 740 by the processor 460 or other suitable component associated with the system 400, the likelihood of a match assigned to the annotated unassociated images (represented by $Th_A$) must be 95% or higher. Upon a determination at 740 that the threshold $Th_A$ is less than the predetermined threshold $Th_C$, the annotated unassociated image 458 and the related annotated unassociated image(s), are communicated to the quality control station 444 for additional analysis to determine whether a match does exist at 728. Operations then return to 712, whereupon a determination is made whether another unassociated image remains for processing in the set 410, as discussed in greater detail above.

Upon a determination at 740 that the assigned threshold $Th_A$ is greater than or equal to the predetermined threshold $Th_C$, a high likelihood of a match, operations proceed to 742. At 742, the processor 460 or other suitable component associated with the system 400 aligns the various annotated unassociated images in accordance with, for example, the previous measurements, the contextual determinations, or the like. Following alignment, relating matched annotated unassociated images are fused together to form a single, original document (100 or 200) via operations of the processor 460 or other suitable component associated with the system 400 at 744. Thereafter, at 746, the fused original document (100 or 200) to the image repository 450. In accordance with additional embodiments of the subject application, the fused document may be output via the output device 446 to one or more of an index process 448, an image repository or data memory 450, a client terminal 452, or a printer 456, optionally through a network 454 such as the Internet.

Figure 8:
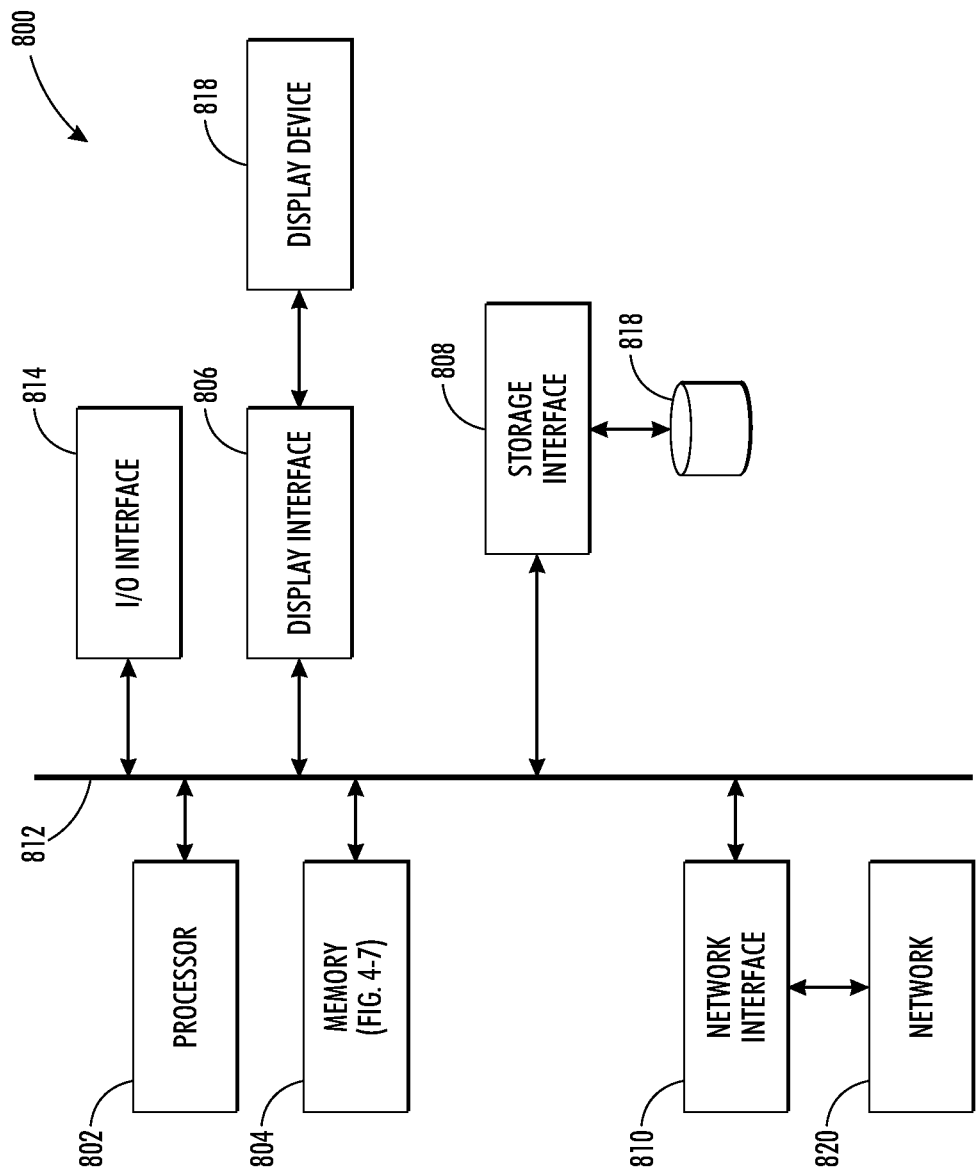
FIG. 8 is a diagram illustrating in more detail a computer system that is capable of implementation to facilitate the fusing of unassociated images into an original document image according to one embodiment of the subject application.

Turning now to FIG. 8, illustrated is a representative computer system 800 (depicted in FIG. 4 as the system 400) that facilitates the fusing of unassociated images into an original document image in connection with one embodiment of the subject application. The computer system 800 includes a processor unit 802 which is advantageously placed in data communication with memory 804, which may include, for example and without limitation, non-volatile read only memory, volatile read only memory, random access memory or a combination thereof, a display interface 806, a storage interface 808, and a network interface 810. In one embodiment, interface to the foregoing modules is suitably accomplished via a bus 812. The processor 802 executes, and the memory 804 stores computer-executable instructions for performing the various functions, methods, steps, techniques, and the like, described herein. The processor 802 and memory 804 may be integral to each other or remote but operably coupled to each other.

The memory 804 suitably includes firmware, such as static data or fixed instructions, such as BIOS, system functions, configuration data, and other routines used for operation of the computer system 800 via the processor 802. The memory 804 is further capable of providing a storage area for data and instructions associated with applications and data handling accomplished by the processor 802.

The display interface 806 receives data or instructions from other components on the bus 812, which data is specific to generating a display to facilitate a user interface. The display interface 806 suitably provides output to a display device 818, suitably a video display such as a monitor, LCD, plasma, or any other suitable visual output device as will be appreciated by one of ordinary skill in the art.

As will be appreciated by those skilled in the art, the storage interface 808 is configured to provide a mechanism for non-volatile, bulk or long term storage of data or instructions in the computer system 800. The storage interface 808 suitably uses a storage mechanism, such as storage 816, suitably comprised of a disk, tape, CD, DVD, or other relatively higher capacity addressable or serial storage medium.

The network interface 810 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration, the network interface 810 connected to a physical network 820, suitably comprised of a local area network, wide area network, or a combination thereof.

An input/output interface 814 in data communication with the bus 812 is suitably connected with input devices, such as a keyboard, mouse, pointing device, touch screen inputs, or the like. In addition, the input/output interface 814 is further capable of data output to a peripheral interface, such as a USB, universal serial bus output, SCSI, IEEE 1394 output, or any other interface as may be appropriate for a selected application.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for fusing unassociated images into an original document image comprising:
   with a processor, receiving an annotated unassociated image into a set of annotated unassociated images in computer memory by an associated scanning device;
   determining a size for each annotated unassociated image;
   comparing the size of each annotated unassociated image with respect to at least one other known image size;
   retrieving a matching related annotated unassociated image from the set of annotated unassociated images corresponding to each annotated unassociated image based at least in part on an output of the comparison;
   determining a contextual relationship for each of the annotated unassociated images; and
   assigning a confidence threshold rating to identify the matches of related images in the set of annotated unassociated images responsive to the determined contextual relationship corresponding thereto;
   aligning the matches of related images; and
   fusing the matches of related images to form an original document image.

2. The method of claim 1, wherein the determining the size for each annotated unassociated image further comprises measuring at least a height, a width, or a combination thereof, for each annotated unassociated image.

3. The method of claim 1, further comprising comparing the assigned confidence threshold rating to a predetermined confidence threshold rating, wherein fusing is performed in accordance with an output of the threshold comparison indicating the assigned confidence threshold rating is greater than or equal to the predetermined confidence threshold rating.

4. The method of claim 3, further comprising performing optical character recognition on each of the annotated unassociated images so as to generate optical character recognition data corresponding thereto, wherein the contextual relationship is determined in accordance with the optical character recognition for each annotated unassociated image.

5. The method of claim 4, further comprising classifying a type of document from which the annotated unassociated images originated in accordance with the optical character recognition, wherein matching related unassociated images are of the same classification type.

6. The method of claim 5, further comprising performing natural language processing on the optical character recognition data for each of the annotated unassociated images classified as the same type of document, wherein the contextual relationship is determined in accordance with the natural language processing.

7. The method of claim 1, wherein the annotated unassociated images include a plurality of orphan annotated unassociated images, further comprising sending the orphan annotated unassociated images to a quality assurance operator for identifying physically the matches in the set of orphan annotated unassociated images.

8. A computer program product comprising a non-transitory recording medium storing instructions, which when executed by a computer causes the computer to perform the method of claim 1.

9. A system for fusing unassociated images into an original image comprising memory which stores instructions for performing the method of claim 1 and a processor in communication with the memory for executing the instructions.

10. A computer-based system for electronically fusing annotated unassociated images into an original document image, comprising:
   a computer processor;
   computer memory which stores:
      a scan selection module operative to receive an annotated unassociated image into a set of annotated unassociated images,
      a size determination module operative to determine a size for each annotated unassociated image,
      a comparison module operative to compare the size of each unassociated image with respect to at least one other known image size,
      a retrieval module operative to retrieve a matching related unassociated image from the set of unassociated images corresponding to each unassociated image based at least in part on an output of the comparison module,
      a contextual relationship module operative to determine a contextual relationship for each of the annotated unassociated images, and
      a confidence threshold rating module operative to assign a confidence threshold rating to identify the matches of related images in the set of annotated unassociated images responsive to the determined contextual relationship corresponding thereto, and
      a threshold comparison module operative to compare the assigned confidence threshold rating to a predetermined confidence threshold rating such that the fusing component is operative in accordance with an output of the threshold comparison module indicating the assigned confidence threshold rating is greater than or equal to the predetermined confidence threshold rating,
      an alignment module operative to align the matches of related images, and
      a fusion module operative to fuse the matches of related images to form an original document image;
   the computer processor implementing the modules.

11. The system of claim 10, wherein the determination module is further operative to determine the size of the annotated unassociated image in accordance with a digital measurement of at least a height, a width, or a combination of both.

12. The system of claim 10, further comprising:
an optical character recognition module;
wherein the optical character recognition module is operative to:
perform optical character recognition on each of the annotated unassociated images so as to generate optical character recognition data corresponding thereto, wherein the contextual relationship is determined in accordance with the optical character recognition for each annotated unassociated image.

13. The system of claim 12, further comprising:
a classification module;
wherein the classification module is operative to:
classify each unassociated image as a document type in accordance with an output of the optical character recognition module.

14. The system of claim 13, further comprising:
a natural language processing module,
wherein the natural language processing module is operative to:
perform language processing on the optical character recognition data for each of the annotated unassociated images classified with a same document type, wherein the contextual relationship is determined in accordance with the natural language processing.

15. The system of claim 10, further comprising:
an output component;
wherein the output component is operative to:
send the original document image to an image repository.

16. The system of claim 10, further comprising:
a quality assurance module;
wherein the quality assurance module is operative to:
send orphan unassociated images to a quality assurance operator for identifying physically the matches of related images in the set of orphan unassociated images.

17. A computer-implemented method for fusing unassociated images into an original document image comprising:
with a processor, receiving a plurality of unassociated images into for a set of unassociated images in computer memory;
determining a size for each unassociated image wherein the detecting of the size is based on a digital measurement of at least a height, a width, or a combination of both;
comparing the size of each unassociated image with respect to at least one other known image size to find matches of related images in the set of unassociated images;
retrieving a matching related unassociated image from the set of unassociated images corresponding to each unassociated image based at least in part on an output of the size comparison;
determining a contextual relationship for each of the related annotated unassociated images;
assigning a confidence threshold rating to identify the matches of related images in the set of annotated unassociated images responsive to the determined contextual relationship corresponding thereto;
comparing the assigned confidence threshold rating to a predetermined confidence threshold rating;
fusing the matches of related images to form an original document in accordance with an output of the comparison indicating the assigned confidence threshold rating is greater than or equal to the predetermined confidence threshold rating; and
communicating the original document to an image repository.

* * * * *